Aug. 15, 1944. A. M. MacFARLAND 2,355,985
DRY CELL APPARATUS
Filed Feb. 25, 1942 7 Sheets-Sheet 5

Inventor:
Allison M. MacFarland
By Tesch and Darbo
Attys

Aug. 15, 1944.    A. M. MacFARLAND    2,355,985
DRY CELL APPARATUS
Filed Feb. 25, 1942    7 Sheets-Sheet 6

Inventor:
Allison M. MacFarland
By Lesch and Darbo
Att'ys.

Patented Aug. 15, 1944

2,355,985

UNITED STATES PATENT OFFICE 2,355,985

DRY CELL APPARATUS

Allison M. MacFarland, Freeport, Ill., assignor to Burgess Battery Company, Chicago, Ill., a corporation of Delaware Application February 25, 1942, Serial No. 432,289

7 Claims. (Cl. 93—81)

This invention relates to apparatus for making dry cells and particularly for forming multiple-layer cylindrical metal anodes for such dry cells. A dry cell having a metal anode of this type is described and claimed in C. F. Burgess United States Patent 2,231,320, granted February 11, 1941, and it is the object of the present invention to provide an apparatus for forming the cylindrical electrodes of the multiple-layer type at high speed. In an electrode of this type, an adhesive is applied to the inter-layer surfaces and serves to join the layers together. It is desired that no adhesive be applied to that surface of the metal which forms the interior surface of the cylinder and which in the finished dry cell is exposed to the electrolyte. The apparatus of this invention is adapted for applying the adhesive to the desired portion of the surfaces only.

Figures 9, 11:
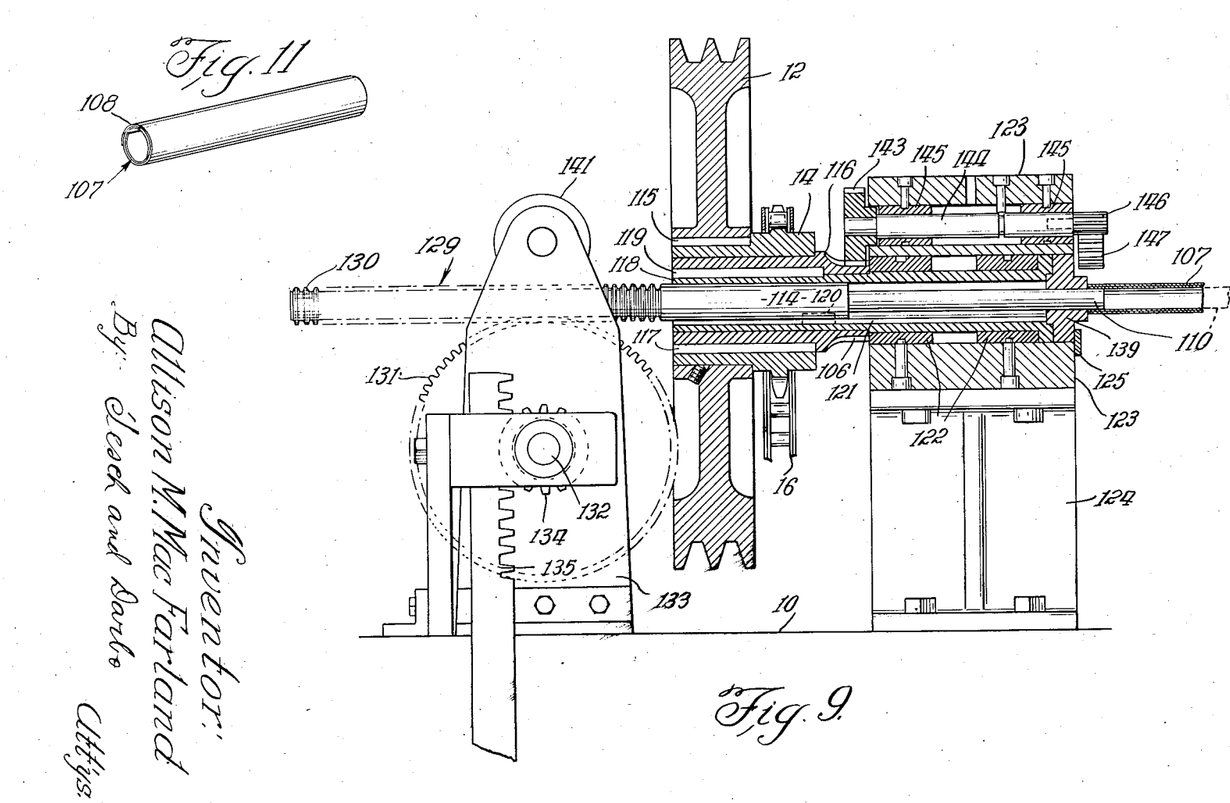
Fig. 9 is a sectional view along line 9—9 of Fig. 1.
Fig. 11 is a perspective view of the multiple-layer cylindrical electrode which is formed by the apparatus.

Briefly, the apparatus comprises means for intermittently advancing an elongated strip of the thin electrode metal and severing sections of a metal of a length suitable for forming into the multiple-layer cylindrical electrode during pauses in the advance movement of the strip, advancing the served sections in succession, and at a subsequent station applying a thin film of viscous adhesive to the proper portion of the surface of each section, thereafter advancing the sections to a mandril and rolling the sections about the mandril into the form of muliple-layered cylinders, open at both ends, with the adhesive located between the contiguous surfaces of the adjacent layers and simultaneously pressing the layers together into firm adhesive contact, and thereafter stripping the cylindrical electrodes from the mandril. The electrodes are then ready for use in forming the dry cells. The electrode is shown in Fig. 11 and consists of an open ended cylinder 107 composed of a plurality of adhesively joined layers 108 of thin sheet zinc or other metal.

Figure 1:
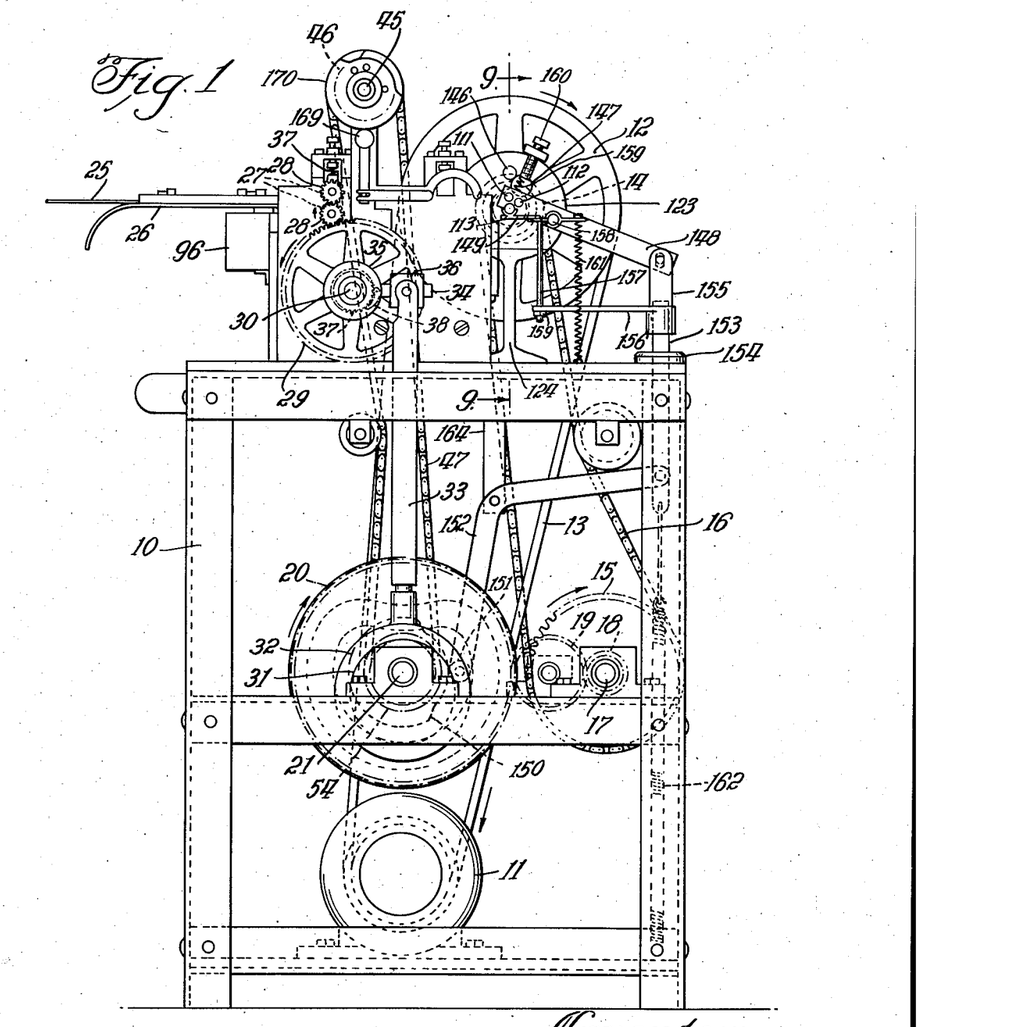
Fig. 1 is a side elevational view of the apparatus with some of the parts omitted for the sake of clearness.

The general features of the apparatus are shown in Fig. 1. The apparatus is supported upon a main frame 10. The motive power is supplied to the moving parts by the electric motor 11, which is carried by frame 10 and drives the main driving pulley 12 by means of a suitable driving belt 13. The driving pulley 12, in turn, imparts motion to a sprocket 14, which is mounted upon the same shaft as pulley 12, this motion being transmitted to a second sprocket 15 by means of a chain 16. Motion is transmitted from sprocket 15 to a shaft 17 upon which sprocket 15 is mounted and thence to a gear 18 which is also mounted on shaft 17, and from gear 18 through idler gear 19 to gear 20, which is mounted on and imparts motion to a shaft 21. Shaft 21 carries and imparts motion to several cams and sprockets which serve to drive different parts of the apparatus as will be described hereinafter. The direction of rotation of the motor and several of the members of this power transmission train is indicated by arrows.

Figure 4:
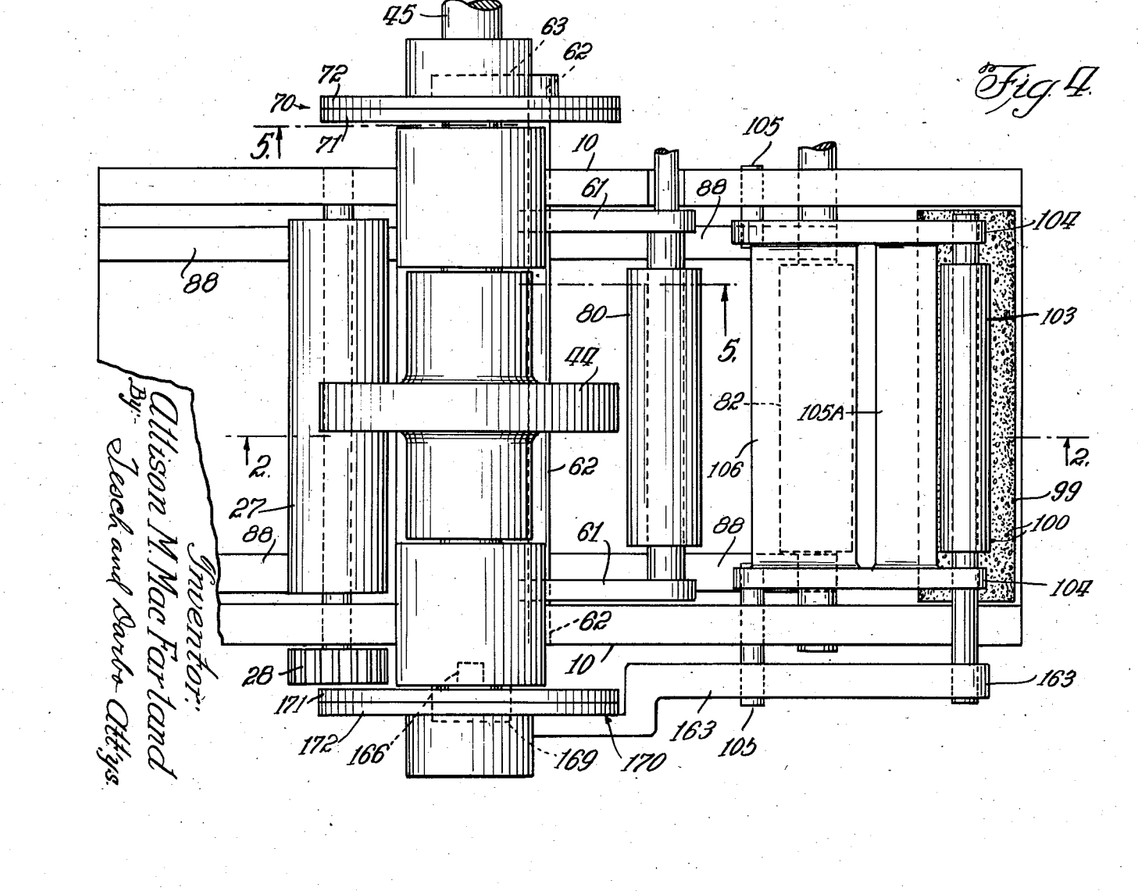
Fig. 4 is a plan view of a part of the apparatus.

The thin sheet metal 25 which is to be formed into the electrodes, preferably in the form of an elongated strip of a width equal to the length of the cylindrical electrode which is to be formed, is fed into the apparatus while being supported upon a suitable platform or support 26. Its forward motion is from left to right in Fig. 1 and is induced and controlled by a pair of cooperating rolls 27, which are pressed together in the conventional manner by spring 37 which applies pressure to the bearing for the upper roll. The feeding motion is intermittent and is imparted to the rolls 27 by means of gears 28 which are mounted at one end of the shafts carrying the rolls (see Fig. 4) and engage one another. The lower gear receives its motion from gear 29 which is rotatably mounted on shaft 30 which is supported by frame 10. An intermittent motion is imparted to gear 29 by means of an eccentric cam 31 which is mounted on shaft 21 and cooperates with annular cam-follower 32. A rod 33 connects the cam-follower 32 with an arm 34 which projects radially from an oscillating block 35 which is mounted rotatably upon shaft 30. A head member 36 is mounted pivotally upon the end of rod 33 and forms a swivel connection between rod 33 and arm 34 to accommodate the rotary motion which is undergone by the arm 34 during the reciprocation of the rod 33. Gear 29 carries a ratchet 37 and a cooperating pawl 38 is mounted on the oscillating block 35.

The intermittent forward motion of the strip 25 is accomplished in the following manner. The rotary motion of the eccentric cam 31 imparts a reciprocating motion to rod 33 which imparts an oscillating motion to block 35. The cooperating ratchet 37 and pawl 38 translates the upstroke movement of rod 33 into a rotary motion of gear 29 and rolls 27 such as to feed the sheet material forwardly, while on the downstroke movement of rod 33, gear 29 remains at rest. Therefore, at each oscillation of rod 33 the sheet material is given an intermittent advance movement.

During each pause in the advance of the strip 25, the forward end portion thereof is severed from the main body of the strip by a reciprocating knife which operates across the strip at a fixed point upon the apparatus. Each severed section forms the material for a single electrode, and since it may be desirable to form electrodes of different sizes, it is desirable to be able to vary the length of the severed section. The head member 36 is mounted in adjustable manner upon arm 34 and may be fixed in position at any desired distance from the center line of shaft 30. The details of the adjustable mounting are not shown. The stroke of gear 29, and likewise, the advance travel of strip 25 varies inversely with the distance of the member 36 from the center line of shaft 30, and any desired length of severed section may be obtained by adjusting member 36 to the proper position on arm 34.

Figure 7:
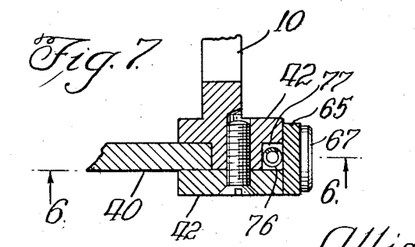
Fig. 7 is a sectional view along line 7—7 of Fig. 6.

The means for severing the sheet material for a single electrode from the end of the elongated strip 25 comprises a knife 40 (see Figs. 2 and 3) which is mounted upon a vertically reciprocable head 41. Each end of the knife 40 slides in one of the slots of a vertical H-shaped guide member 42 (see Fig. 7), which extends upwardly from base member 39 which is mounted in a suitable manner upon the main frame 10. The vertical motion is imparted to knife 40 by means of a cam 44 which rotates with a shaft 45 which is journaled in supporting members 53, which are carried upon the upper ends of guide members 42. Motion is imparted to the shaft by sprocket 46, which is shown in Fig. 1, and which is mounted upon the portion of the shaft which is severed in Fig. 4. Sprocket 46 is driven by means of chain 47 and a second sprocket 54 which is mounted fixedly upon shaft 21.

The knife 40 is in the general form of a rectangle, with its central portion recessed from the top downwardly at 48. The reciprocating head 41 is located in the recess 48 and at its upper portion carries a shaft 49 upon which is rotatably mounted a cam-follower wheel 50. When the projection 55 upon the surface of cam 44 (see Fig. 2) engages cam-follower 50, the knife is lowered for the strip-severing operation. When the projection 55 passes beyond the cam-follower 50, the knife is raised again by means of tension springs 51 which are connected between main supporting members 53 and a yoke 52 which is fastened to the reciprocating head 41. Projection 55 of cam 44 is so arranged as to cause severance of the strip 25 at the proper time during each pause in the forward movement of the strip. A base plate 56 cooperates with the knife 40 during the severing operation.

Following the severance of the electrode-forming section 57 of the sheet material, the section is advanced in a predetermined manner in synchronism with the operation of the adhesive-applying, cylinder-rolling, and mandril-stripping-mechanisms. This is accomplished in the following manner. A section-advancing roll 60 is continuously driven in the direction indicated by the arrow in Fig. 2 by the prime mover by intervening gearing which is suitably mounted on the main frame 10 and which is not shown. The roll 60 is arranged so as to advance the sheet material only at desired times in order that the proper synchronism is obtained. For this purpose, the roll 60 is arranged at a slightly lowered elevation, such that normally its surface does not contact the sheet material, and mechanism is provided for compressing the sheet material against the roll 60 at the desired times. During such times the sheet material is advanced. The thin sheet material is sufficiently flexible to bend readily into contact with roll 60.

The mechanism for pressing the sheet against roll 60 is shown in Figs. 4 to 7 and comprises a cooperating roll 80 which is rotatably supported at its ends by bars 61 which are adapted to move roll 80 into and out of pressure engagement with roll 60 at predetermined times. Bars 61 are connected together by a bracing bar 59 (omitted from Fig. 4 for clearness) and are fixedly attached to a rod 62, which extends transversely of the apparatus and is pivotally supported by and extends through both side members of the main frame 10. A further bar 63 is also fixedly attached to the rod 62 at the end thereof and extends in a direction substantially opposite to bars 61. Bar 63 is slotted at its end and a pin 64 which is mounted upon a vertical bar 65 cooperates with the said slot. Bar 65 is adapted to reciprocate vertically and is guided by a projection 66 thereon and pin 64 which slide in the exterior slot 77 of vertical H-member 42 (see Fig. 7). The reciprocating bar 65 is held in place by a large headed bolt 67 which is mounted in H-member 42 and passes through a slot 68 in bar 65. Vertical bar 65 carries a cam-follower wheel 69 which is adapted to cooperate with a cam 70 which is mounted upon shaft 45.

Figures 5, 6:
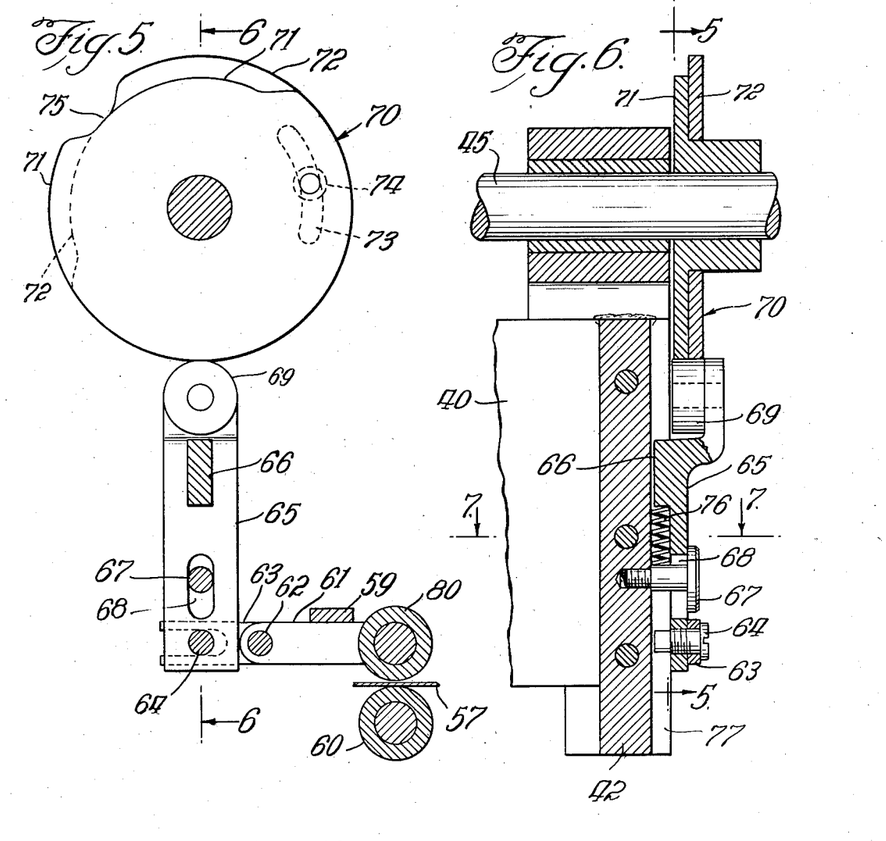
Fig. 5 is a sectional view of a portion of the apparatus taken along the broken line 5—5 of Fig. 4 and along line 5—5 of Fig. 6.
Fig. 6 is a sectional view along line 6—6 of Figs. 5 and 7.

Cam 70 comprises two parts 71 and 72. Part 71 is mounted fixedly upon shaft 45 and part 72 is mounted loosely. Part 72 has a slot 73 therein and a threaded bolt 74 passes through slot 73 and is threaded into part 71, whereby the two parts may be clamped together in adjustable manner. Parts 71 and 72 each has an elongated depression in its cam surface as is shown in Fig. 5, and by adjusting the relative positions of the parts a resultant depression 75 of any desired length may be obtained. The cam-follower 69 makes contact with both of the cam parts whereby its upward movement is controlled by the resultant depression 75. A compression spring 76 is arranged in the slot 77 of H-member 42 and under compression between the shank of bolt 67 and projection 66, whereby the spring continuously urges bar 65 upwardly.

When the depression 75 is reached by the cam-follower 69, the latter and bar 65 are moved upwardly by spring 76 and bar 63 pivots upwardly upon rod 62, bars 61 at the same time pivoting downwardly and roll 80 moving into pressure engagement with roll 60. Roll 80 is continuously driven by the prime mover by means of gearing which is not shown. The depression 75 of cam 70 is arranged in such location that in proper synchronism with the movement of the remainder of the apparatus, roll 80 moves downwardly and presses the sheet material against roll 60 and the two rolls move the sheet section 57 forwardly a sufficient distance to cause it to engage the next pair of sheet-advancing rolls 81 and 82.

Figure 8:
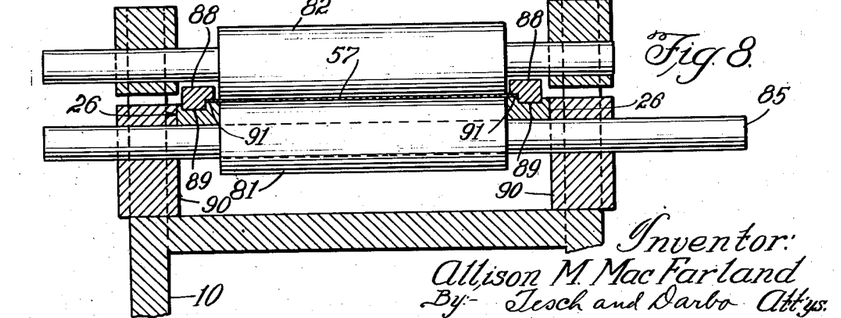
Fig. 8 is a sectional view along line 8—8 of Fig. 2.

The arrangement of rolls 81 and 82 is shown in detail in Fig. 8. Both of the rolls are driven continuously by the prime mover by means of gearing which is not shown. Guide members are provided for guiding the thin sheet material forwardly between the rolls in its travel. Such guide means comprises two L-shaped guide bars 88 which extend longitudinally and are mounted in longitudinal slots 89 in support 26 which is supported at this point by side plates 90 which, in turn, are supported by the main frame 10 of the device. One leg of each of the L-shaped guide bars is directed inwardly toward the center of the sheet material and is spaced from the supporting bars 89 whereby the said bars form a pair of slots 91 within which the edge portions of the sheet material are held during its forward travel.

Figure 2:
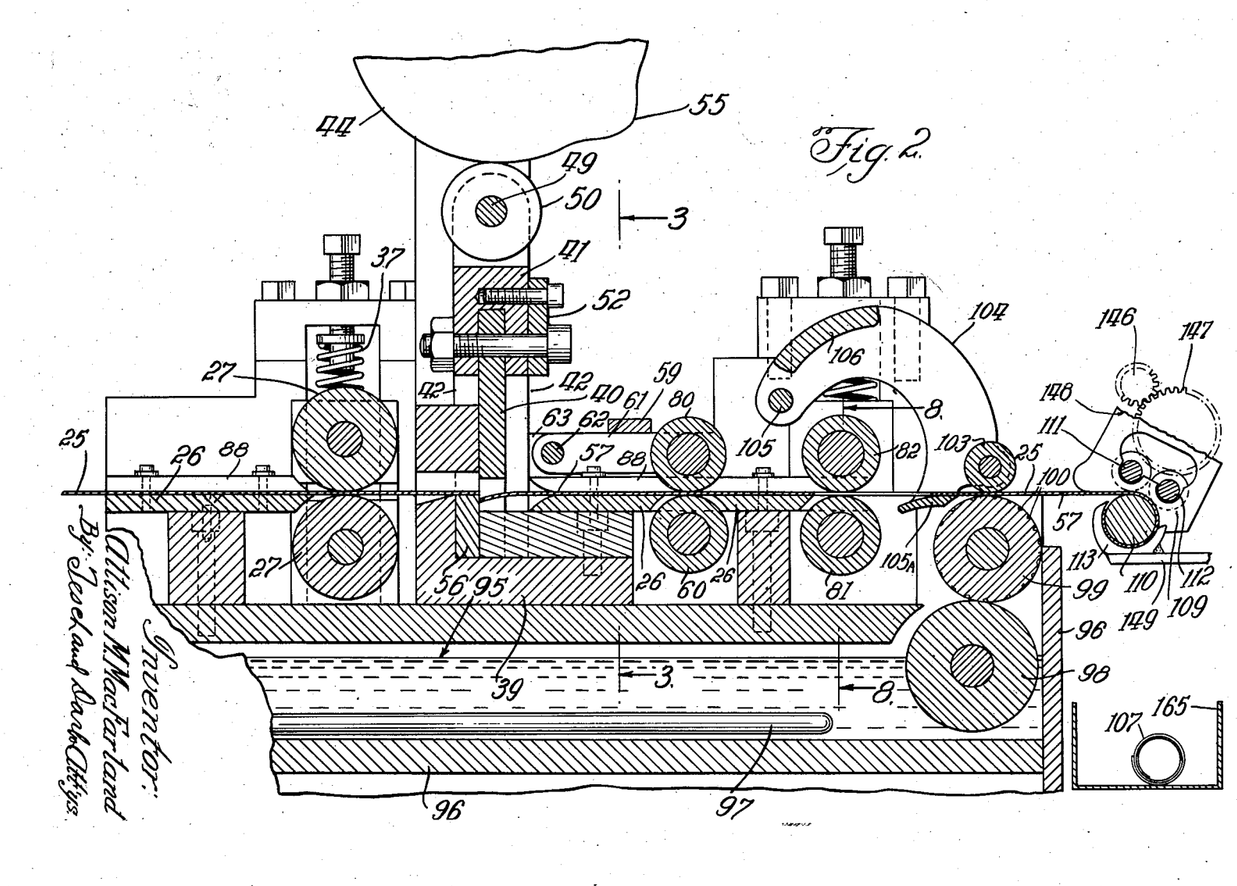
Fig. 2 is a longitudial sectional view of a portion of the apparatus, taken along lines 2—2 of Fig. 3 and Fig. 4.
Figure 3:
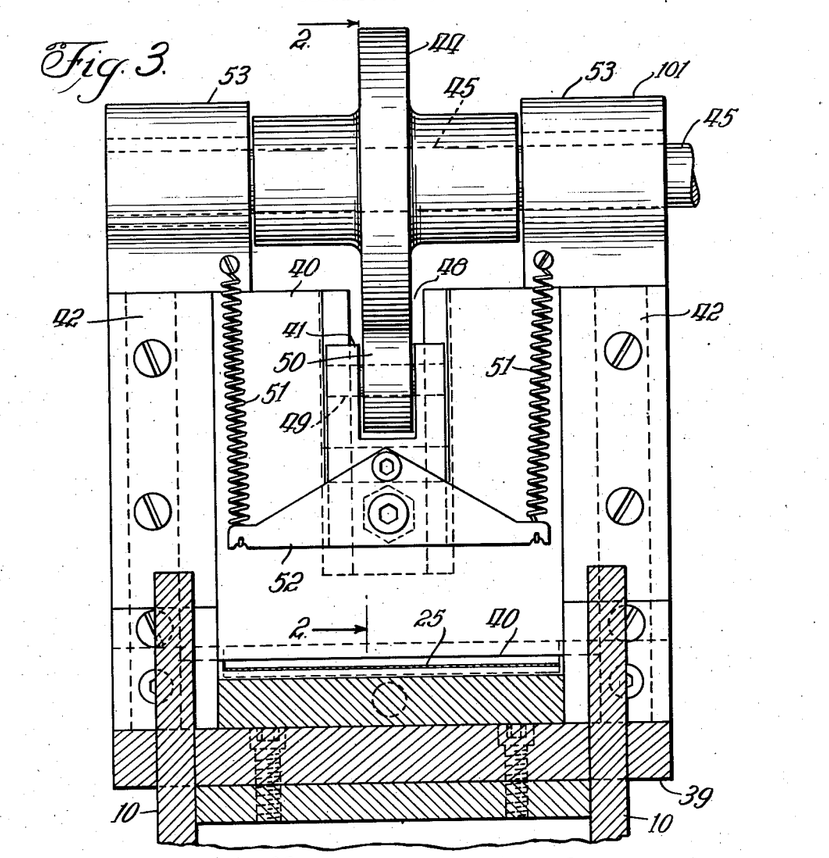
Fig. 3 is a transverse sectional view of the apparatus, taken along line 3—3 of Fig. 2.

As the electrode-forming sheet travels forward, a viscous adhesive is applied to one surface thereof, and the mechanism for applying the adhesive in proper synchronism with the movement of the material is as follows. As is shown in Fig. 2, the adhesive 95 is contained in an open-top receptacle 96 which is arranged beneath the traveling sheet material and is supported by the main frame 10. A liquid adhesive is used which sets relatively quickly and has suitable properties for use in a dry cell. An adhesive of the thermal type is preferred, that is, of the type which becomes softened and fluid when heated and hard when cold. Polyvinyl acetate resin is an example of a suitable adhesive. An electrical heating element 97 maintains the adhesive in the fluid condition. A roll 98 is partially submerged in the adhesive at a point somewhat in advance of rolls 81 and 82 in the direction of travel of the sheet material. The function of the roll 98 is to collect adhesive upon its surface. Roll 98 may be composed of any suitable material, and it has been found that smooth-surfaced metal is satisfactory. A second roll 99 rotates in contact with the surface of roll 98 and receives adhesive from roll 98. Roll 99 may also be composed of metal and its surface may be smooth or provided with distributed small local depressions 100, which serve as receptacles for the adhesive. It has been found that better uniformity and regulation of the quantity of adhesive is obtained by employing two rolls in the relation shown. Rolls 98 and 99 are driven continuously by the prime mover by means of suitable gears which are not shown.

Normally the upper surface of roll 99 is slightly lower than the lower surface of the sheet material 25 whereby it is out of contact with the sheet material and the adhesive is not applied to the sheet material. Mechanism is provided for depressing the sheet material into contact with roll 99 at the proper times so as to coat the desired portion of the surface thereof. This mechanism comprises a roll 103 (see Figs. 2 and 4), which is rotatably mounted upon the end of a pair of curved bars 104, which are pivotally supported upon the frame by a pair of rods 105. The mechanism for pivoting the bars 104 comprises the bar 163 which cooperates with cam 170 and cam-follower 169 in the same manner that bar 63 cooperates with cam 70 and cam-follower 69. Cam 170 is made up of two parts 171 and 172 similar to parts 71 and 72 of cam 70 and has a depression therein similar to depression 75 of cam 70 and roll 103 moves downwardly and presses the sheet section 57 into contact with the adhesive-carrying roll 99 at the proper time such that the adhesive is applied to that portion of the sheet metal which becomes the inter-layer surface in the completed cylindrical electrode.

The adhesive continues to be applied to the under surface of the sheet section 57 until the roll 103 is again raised out of contact with the sheet section. This is caused to occur an instant before the end of the section passes between the rolls 99 and 103 in order to avoid the application of adhesive to the surface of roll 103. A bar 105A extends across the apparatus between the two bars 104 and beneath the sheet section 57, whereby when the roll 103 is in the raised position, bar 105A engages the under side of the forward end of the oncoming sheet section and lifts it out of contact with roll 99, thereby insuring that adhesive will not be applied to an area where its presence is not desired. A second bar 106 joins the two bars 104 and gives added strength to the construction.

The adhesive-coated section 57 next passes to the mechanism for rolling it into a multiple-layer cylinder and adhesively joining the adjacent layers. The mechanism comprises a mandril 110 about which the sheet material is wound to form the cylinder. The mandril is rotated by the prime mover in a direction such as to draw the section 57 forward. The sheet material is coiled around the mandril by means of cooperating guide member 109, rolls 111 and 112 and shoe 113. These cooperating members are mounted upon movable supports 148 and 149 as will be described hereinafter. The guide member 109 has a surface curved in an arc conforming to the curvature of mandril 110 and cooperates with the mandril to guide the oncoming sheet material closely about the mandril and between the mandril and the rolls and shoe. The guide member is thin and is accommodated by slots in the rolls, as shown in Fig. 2. The end of the guide member overlaps the end of the shoe 113 and is accommodated in a slot in the shoe. This insures that the sheet will be guided beneath the shoe in the desired manner. Several of such guide members may be employed if required, spaced apart across the width of the sheet. Any desired number of layers may be incorporated into the completed cylinder, and the mechanism presses the layers together into firm contact whereby they are joined together in a tight adhesive joint. After the cylinder is formed upon the mandril, it is stripped therefrom and is ready for use in a dry cell.

Figure 10:
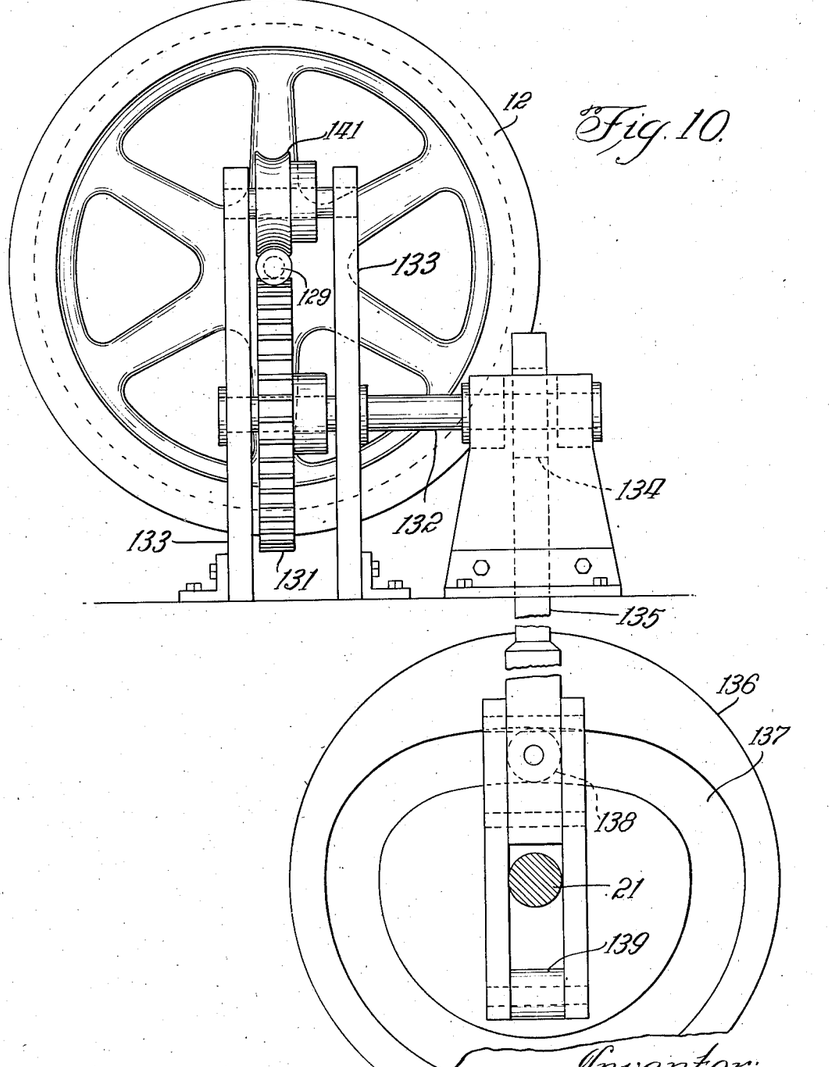
Fig. 10 is an elevational view of a portion of the apparatus taken from the left hand end of Fig. 9.

The mechanism for operating the mandril and stripping the cylinder from it is shown in detail in Figs. 9 and 10. The mandril 110 comprises the reduced end of a shaft 114, upon which the main driving pulley 12 is mounted. The pulley 12 is mounted upon the hub of gear 14, which, in turn is mounted upon the hub of gear 116, which is mounted upon sleeve member 118 which surrounds shaft 114. All of these parts are keyed together by means of keys 115, 117, 119 and 120 and they all rotate together, whereby the rotary motion of pulley 12 is transmitted to the mandril 110. An elongated key-way 121 is provided for key 120, whereby shaft 114, together with key 120, may undergo longitudinal reciprocating motion, simultaneously with its rotary motion, for the purpose of stripping the formed cylinders from the mandril, as will be described hereinafter. The supporting bearing for this rotary movement is a pair of bearings 122 which cooperate with sleeve member 118 and are mounted upon supporting member 123, which in turn, is supported upon main frame 10 by means of frame member 124.

The means for imparting the reciprocating motion to mandril 110 are as follows. Shaft 114 has a part 129 thereof which extends in the opposite direction from mandril 110 and which is provided with gear teeth 130 which extend circumferentially thereof and have zero pitch. The teeth 130 cooperate with a circular gear 131 which is mounted fixedly upon shaft 132, which, in turn, is mounted rotatably upon frame member 133, carried by main frame 10. A second gear 134, of smaller diameter than gear 131, is also mounted fixedly upon shaft 132 and cooperates with a gear rack 135 in such manner that vertical reciprocating motion of the rack imparts an oscillating rotary motion to gears 134 and 131. A grooved pulley 141 is mounted in freely rotatable manner upon the frame member 133 upon the opposite side of toothed portion 130 of shaft member 114 and serves as an idler for holding the shaft in firm engagement with the gear 131. Reciprocating motion is imparted to rack 135 by means of a cam 136 which is mounted fixedly upon shaft 21. Cam 136 has a cam-groove 137 therein which is in the form of a circle flattened throughout a portion of its length. A cam-follower 138 mounted upon rack 135 cooperates with cam-groove 137. A roller bearing member 139 is provided at the lower end of the rack 135 and rolls upon the surface of cam 136 to reduce the friction between the parts.

The operation is as follows. Commencing with the mandril in the extended position, indicated in dotted lines in Fig. 9, rotation is imparted to the mandril by pulley 12 as has been described heretofore and the cylinder of thin sheet metal is formed thereon into the multiple-layer electrode 107. After the cylinder has been formed, a downward motion is imparted to rack 135 by cam 136, whereby gear 131 is rotated counterclockwise as it is seen in Fig. 9 and shaft 114 and mandril 110 are moved to the left into the retracted position, the shaft and mandril meanwhile continuously undergoing rotary motion imparted by pulley 12. The zero-pitched gear teeth 130 permit this continuous rotary motion to take place, while at the same time, they cause the oscillatory motion of gear 131 to be translated into a reciprocating motion of the shaft 114. A stripper plate 139 surrounds mandril 110 and is held in place by supporting member 123 and a retaining ring 125. During the retracting motion of mandril 110, stripper plate 139 engages the end of the newly formed cylinder 107 and prevents it from being retracted with the mandril, whereby the cylinder is stripped from the mandril and falls into a receptacle 165 which is provided for the purpose. In Fig. 9 the apparatus is shown in the position in which the cylinder is being stripped from the mandril. After this has been done, an upward return movement is imparted to rack 135 by cam 136, and mandril 110 is thereby returned to the extended position.

The means for rolling or wrapping the sheet metal about mandril 110 comprises the guide member 109, together with the two rolls 111 and 112 and the curved shoe 113 (see Fig. 2) which are arranged at progressive points about the circumference of the mandril and are adapted to move into and out of pressure engagement with the mandril in synchronism with the advance of the metal sheet material. Rolls 111 and 112 are provided with gear teeth at one end and are continuously driven by the prime mover by the following train of members: gears 116 and 143, shaft 144 (see Fig. 9), gears 146 and 147 (see Fig. 2), and the gear teeth at the ends of rolls 111 and 112. Gear 147 engages the gears at the ends of both rolls as is indicated in Fig. 2. Shaft 144 is suitably mounted on bearings 145 which are mounted upon supporting member 123. As the sheet advances, its front edge passes between the mandril and guide member 109, the latter causing the sheet to bend and follow the contour of the mandril surface. At the same time, the sheet passes between rolls 111 and 112 and the mandril. The sheet then passes between the mandril and shoe 113. The rolls and the shoe are in pressure engagement with the sheet, which engagement is continued until the sheet has been completely rolled up. As a result, an accurately sized multiple-layer cylinder is formed. The adhesive undergoes sufficient cooling and hardening during this time, whereby an adhesive joint is formed between the layers which maintains the cylinder in its form. After the sheet has been rolled into a cylinder, the rolls and the shoe are reciprocated out of pressure engagement with the mandril. The means for supporting and imparting reciprocal motion to the rolls and the shoe are shown in Fig. 1. Rolls 111 and 112 and their driving gear 147 are mounted upon the end of a supporting arm 148 and shoe 113 is mounted upon the end of a second supporting arm 149, arms 148, and 149 both being pivotally mounted upon shaft 158 which is carried by frame member 123. Supporting arm 148 is adapted to oscillate through a short stroke about shaft 158 and gear 146, which is mounted upon stationary support 123, is adapted to make continuous engagement with gear 147 which is mounted upon movable support 148. Oscillating motion about shaft 158 is imparted to supporting arms 148 and 149 by a train of parts comprising cam 150 which is mounted fixedly on shaft 21 and cooperates with cam-follower 151 on the end of lever 152 to impart an oscillating motion to lever 152, which is mounted pivotally upon bracket 164 which is supported by the main frame. The opposite end of lever 152 is connected to one end of a vertically reciprocable bar 153, which passes through a guide member 154 and is attached at its opposite end to a link member 155 which is connected to the end of supporting arm 148 which is on the opposite side of supporting shaft 158 from the rolls 111 and 112. Upward movement is imparted to bar 153 by lever 152 and downward movement is imparted by tension spring 162 which is connected between the lower end of said bar 153 and the main frame. The connection between arm 148 and link 155 is by means of a pin and slot, the slot being longer than the diameter of the pin as shown, whereby relative motion between these parts may take place. A compression spring 159 is arrangd to exert pressure against the opposite end of supporting arm 148 and adapted to cause rolls 111 and 112 to press against the mandril 110. Spring 159 is held in place by adjustable retaining member 160, which is mounted upon supporting member 123.

Bar 153 is also connected by means of bracket 156 and rod 157 to supporting bar 149 at a point adjacent shoe 113. Rod 157 passes through an opening in bracket 156 and has a nut at the end whereby upward motion of bracket 156 is not transmitted to rod 157 but downward motion is, and serves to draw arm 149 and shoe 113 downwardly out of engagement with mandril 110. A tension spring 161 is attached between the main frame and the end of arm 149 which extends beyond shaft 158 from shoe 113 and is adapted to draw the shoe upwardly into yielding pressure engagement with the mandril when the bar 153 and the bracket 156 is in the raised position.

The operation of the rolls 111 and 112 and shoe 113 is as follows. When, upon the rotation of shaft 21, cam-follower 151 passes from the recessed to the extended surface of cam 150, lever 152 moves in a counterclockwise direction and vertically reciprocating bar 153 moves upwardly. The loose pin and slot connection between link 155 and arm 148 then permits supporting arm 148 (carrying rolls 111 and 112) to be moved in a counterclockise direction by compression spring 159 and arm 149 (carrying shoe 113) is moved in a clockwise direction by tension spring 161, whereby the rolls and the shoe are brought into resilient pressure contact with the mandril 110. When upon the further rotation of shaft 21, cam-follower 151 returns from the extended to the recessed surface of cam 150, the motion is reversed and bar 153 moves downwardly and serves to draw the rolls and shoe out of contact with the mandril. Cam 150 is so arranged that the movement of the rolls and the shoe into contact with the mandril occurs as the forward end portion of the electrode sheet material reaches the mandril, and the pressure engagement continues until the piece of sheet material has been completely rolled into a cylinder and the adhesive joint has been made. The movement of the rolls and the shoe away from the mandril occurs after the cylinder has been completed and prior to the time it is stripped from the mandril. In this manner, upon the stripping of the cylinder from the mandril, the cylinder is free to fall into the receptacle 165.

The sequence of operations of the apparatus is as follows. The strip of sheet material 25 is moved forward intermittently by rolls 27 a distance equal to the desired length of sheet for a single electrode. During a pause in its forward movement, knife 40 severs a section 57 from the strip. After the section has been severed and before the next advance of the strip 25, the continuously moving roll 80 descends and presses section 57 between it and continuously moving roll 60 whereby the section is advanced until it passes between rolls 81 and 82 and roll 80 then moves upwardly again and out of engagement with the sheet. Rolls 81 and 82 are also continuously moving and are in pressure engagement with the sheet material and as a result the section is advanced. Its forward end is held away from adhesive-carrying roll 99 by bar 105A and then passes between mandril 110 and the guide member 109 and rolls 111 and 112 and shoe 113. During this advance and after that much of the section has passed roll 99 as will form the interior layer of the final multiple-layer cylinder, roll 103 descends and presses the section against roll 99 whereby adhesive is applied to its under surface. At approximately the time the rearward end of the section reaches roll 103, the roll moves upwardly again. Rolls 111 and 112 and shoe 13 are in pressure engagement with the mandril and the section is rolled about mandril 110 and compressed into a cylinder with the layers in firm adhesive union. The cylinder is then stripped from the mandril in the manner which has been described heretofore. In the meantime, the strip 25 has been advanced again and a second section severed therefrom and advanced, the said advance being synchronized in such manner that a cylinder has been stripped from the mandril and the mandril is back in position to receive the second section by the time the forward end of the said section arrives at that point.

While but a single embodiment of the apparatus has been described and illustrated, it is obvious that various modifications may be made in the mechanical features thereof, and it is understood that the invention is limited only in accordance with the scope of the appended claims.

I claim:

1. Apparatus for forming multiple-layer cylinders from thin sheet material which comprises a base, a pair of cooperating feed rolls supported on said base and adapted to feed thin sheet material therebetween, means for imparting intermittent forward feeding motion to said feed rolls, a reciprocating knife supported by said base and adapted to sever the forward section of said sheet material during a pause in the forward feed motion of said feed rolls, a second pair of cooperating rotating feed rolls supported by said base on opposite sides of and normally out of pressure engagement with said severed section of sheet material, a third pair of continuously operating feed rolls located forwardly of the forward end of said severed section, means for bringing said second pair of feed rolls into pressure engagement with opposite sides of said severed section at predetermined times, whereby said sections are moved into operative engagement with said third pair of feed rolls in spaced succession, a rotating adhesive supply roll and a cooperating rotating pressure roll positioned on opposite sides of said sheet section respectively in advance of said third pair of feed rolls, said supply and pressure rolls being normally out of contact with said sheet section, means for moving said pressure roll to bring said sheet section into pressure engagement with said supply roll at predetermined times in the advance movement of said sheet section, a mandril mounted for rotation and longitudinal reciprocation on said base and being located in advance of said supply roll, means for rotating said mandril, a plurality of rotating bending rolls and a pressure shoe in cooperative relation with said mandril at progressive points about the circumference of said mandril and adapted to wind said advancing sheet section about said mandril into the form of a multiple-layer cylinder and press the superposed layers of said cylinder together, means for moving said bending rolls and pressure shoe into and out of pressure engagement with said mandril in synchronism with the advance of said sheet material, means for reciprocating said mandril longitudinally back and fourth after the formation of said cylinder thereon, a stationary collar member surrounding said mandril for stripping said cylinder from said mandril during said reciprocation of said mandril.

2. Apparatus for forming multiple-layer cylinders from thin sheet material which comprises a base, a pair of cooperating feed rolls supported on said base and adapted to impart intermittent advance movement to thin sheet material therebetween, a reciprocating knife supported by said base and adapted to sever the forward section of said sheet material during a pause in the advance movement of said sheet material, a second pair of rotating feed rolls supported by said base on opposite sides of said severed sections of sheet material and adapted to move said severed sections forward in spaced succession a rotating adhesive supply roll and a cooperating rotating pressure roll positioned in advance of said second pair of feed rolls and on opposite sides of said sheet material respectively, said supply and pressure rolls being normally out of contact with said sheet material, means for moving said pressure roll to bring a predetermined portion of the surface of each of said severed sections into pressure engagement with said supply roll during the advance movement of said severed sections, a mandril mounted for rotation and longitudinal reciprocation on said base and being located in advance of said supply roll, means for rotating said mandril, a plurality of rotating bending rolls and a pressure shoe in cooperative relation with said mandril at progressive points about the circumference of said mandril and adapted to wind said advancing sheet section about said mandril into the form of a multiple-layer cylinder and press the superposed layers of said cylinder together, means for reciprocating said mandril longitudinally back and forth after the formation of said cylinder thereon, stationary means adjacent said mandril for stripping said cylinder from said mandril during said reciprocation of said mandril, and means for moving said bending rolls and pressure shoe out of engagement with said mandril during said reciprocating movement and into engagement with said mandril following said reciprocating movement.

3. Apparatus for forming multiple-layer cylinders from thin sheet material which comprises a base, a pair of cooperating feed rolls supported on said base and adapted to impart intermittent advance movement to thin sheet material therebetween, a reciprocating knife supported by said base and adapted to sever the forward section of said sheet material during a pause in the advance movement of said sheet material, a second pair of cooperating feed rolls supported by said base on opposite sides of said severed sections of sheet material and adapted to move said severed sections forward in spaced succession, a rotating adhesive supply roll and a cooperating rotating pressure roll positioned in advance of said second pair of feed rolls on opposite sides of said section respectively, said cooperating supply and pressure rolls being normally out of contact with said sheet material, means for moving said pressure roll to bring a predetermined portion of the surface of each of said severed sections into pressure engagement with said supply roll during said forward movement of said sections, a mandril mounted for rotation and longitudinal reciprocation on said base and being located in advance of said adhesive supply roll, means for rotating said mandril, a plurality of rotating bending rolls and a pressure shoe in cooperative relation with said mandril at progressive points about the circumference of said mandril and adapted to wind said sheet section about said mandril into the form of a multiple-layer cylinder and press the superposed layers of said cylinder together, means for reciprocating said mandril longitudinally back and forth after the formation of said cylinder thereon, stationary means adjacent said mandril for stripping said cylinder from said mandril during said reciprocation of said mandril.

4. Apparatus for forming multiple-layer cylinders from thin sheet material which comprises a base, means supported by said base for imparting intermittent advance movement to said sheet material, means for severing the forward section of said sheet material during a pause in the advance movement thereof, means for advancing said severed sections of sheet material at spaced intervals, a cylindrical mandril supported for rotation on said base and being located contiguous to the path of advance of said sheet sections, means for rotating said mandril, means for winding said sheet material about said mandril into a multiple-layer cylinder and pressing the superposed layers of said cylinder together comprising at least one rotating roll and a pressure shoe in cooperative relation with said mandril at progressive points about the circumference of said mandril, means for rotating said roll, means for pressing said roll and pressure shoe against said mandril with yielding pressure, and at least one guide member having a surface conforming to the contour of the surface of said mandril for bending said advancing sheet material about said mandril and between said mandril and said roll and pressure shoe, said pressure shoe having a recess therein accommodating a portion of said guide member to permit overlapping of said guide member and said pressure shoe.

5. Apparatus for forming multiple-layer cylinders from thin sheet material which comprises a base, means supported by said base for imparting intermittent advance movement to said sheet material, means for severing the forward section of said sheet material during a pause in the advance movement thereof, means for advancing said severed sections of sheet material at spaced intervals, a mandril mounted for rotation and longitudinal reciprocation on said base and being located contiguous to the path of advance of said sheet sections, means for rotating said mandril, a plurality of bending rolls in cooperative relation with said mandril at progressive points about the circumference of said mandril and adapted to wind said sheet material about said mandril into the form of a multiple-layer cylinder and press the superposed layers of said cylinder together, means for reciprocating said mandril axially back and forth after the formation of said cylinder thereon, and while undergoing rotation, said means comprising spaced apart teeth extending circumferentially of said mandril at a portion removed from the tube-forming portion thereof, an oscillating toothed gear in cooperative relation with the toothed portion of said mandril, and means for imparting oscillating movement to said gear.

6. Apparatus for forming multiple-layer cylinders from thin sheet material, which comprises means for advancing an elongated strip of sheet material, means for severing sections from said strip, means for advancing said severed sections in spaced succession, means for applying adhesive to a predetermined portion of the surface of each said section, said predetermined portion forming at least a part of the inter-layer surface in the finished cylinder, a mandril supported on a base and adapted for simultaneous rotation and axial reciprocation, said mandril having a cylinder-forming section and a second section having a plurality of spaced-apart teeth extending circumferentially of said second section and having zero pitch, a toothed gear in engaged relation to said toothed section of said mandril and adapted to oscillate axially of said mandril, means for rotating said mandril, means for coiling each of said advancing sections of sheet material about said cylinder-forming mandril and pressing the superposed layers together to form a firm adhesive joint, means for oscillating said gear during rotation of said mandril, and means for stripping the formed cylinders from said mandril during reciprocation of said mandril.

7. Apparatus for forming multiple-layer cylinders from thin sheet material, which comprises means for advancing an elongated strip of sheet material, means for severing sections from said strip, means for advancing said severed sections in spaced succession, means for applying adhesive to a predetermined portion of the surface of each said section, said predetermined portion forming at least a part of the inter-layer surface in the finished cylinder, a mandril supported on a base and adapted for simultaneous rotation and axial reciprocation, means for rotating said mandril, means for coiling each of said advancing sections of sheet material about said mandril and pressing the superposed layers together to form a firm adhesive joint, means for reciprocating said mandril axially during rotation thereof, and means for stripping the formed cylinders from said mandril during said reciprocation of said mandril.

ALLISON M. MACFARLAND.